July 15, 1969      B. E. HEEB      3,455,612

COMBINED MAGNETIC SUSPENSION AND POWER TRANSFER SYSTEM

Filed Dec. 29, 1966

INVENTOR.
Bruce E. Heeb
BY
Thomas N. Young
ATTORNEY

United States Patent Office 3,455,612
Patented July 15, 1969

3,455,612
COMBINED MAGNETIC SUSPENSION AND POWER TRANSFER SYSTEM
Bruce E. Heeb, Peabody, Mass., assignor to General Motors Corporation, Detroit, Mich., a corporation of Delaware
Filed Dec. 29, 1966, Ser. No. 605,842
Int. Cl. F16c 39/06
U.S. Cl. 308—10          9 Claims

ABSTRACT OF THE DISCLOSURE

Combined magnetic bearing and power transfer apparatus for a gyro float is disclosed. Similar units in opposite float ends provide radial and axial magnetic support forces and also two phase power transfer paths across magnetic bearing gaps.

This invention relates to magnetic support means, power transfer means, and, more particularly, to a combined magnetic suspension-transformer by which power may be transferred to an electrical load device which is suspended out of physical contact from the power source.

Taking a gyroscope as an illustrative application of the invention, it is necessary to support the gyro float for freedom of motion about at least one axis and to supply power to the float to run the gyro motor. These two requirements can be satisfied by supporting the float in jeweled bearings and connecting leads between the float and a surrounding housing. Mechanical bearings, however, inevitably produce some friction, and the leads, however light, produce torques on the float. Both of these affects are adverse as far as gyro accuracy is concerned.

In accordance with the present invention, it is possible to support a body, such as a gyro float, and to supply usable power to an electrical load device mounted on the body without the use of such mechanical devices as jeweled or ball-type bearings or conductive leads. Therefore, in application to a gyroscope, the invention eliminates two possible sources of error.

This is accomplished by means of a combination including a stator and a rotor which are to be associated with one another in spaced relation so that the rotor is free to be angularly displaced relative to the stator about a central axis, but is substantially restrained from displacement in other directions. In a preferred form, the stator comprises a substantially cup-shaped member of magnetically permeable material accommodating a plurality of primary coils for producing a time-varying flux pattern in the sidewalls of the member. The rotor comprises a member of permeable material adapted to extend substantially into the stator along the longitudinal axis thereof, and carrying a secondary winding. When the primary windings are energized with alternating current, flux travels from the sidewalls of the stator across a radial gap to the rotor, axially through the rotor and across an axial gap to the end wall of the stator. This flux pattern produces both radial and axial support forces between the members and induces current in the secondary winding which can be used to energize a motor or other power-consuming device.

In application to a single-degree-of-freedom gyro, a rotor-strator combination corresponding to the above description is located at each end of the float, with the longitudinal axis of each combination corresponding to the rotational axis of the float.

The invention as well as an application thereof can be best understood by reference to the following specification which describes a specific embodiment of the invention as applied to gyros. This specification is to be taken with the accompanying drawings of which:

Figure 1:
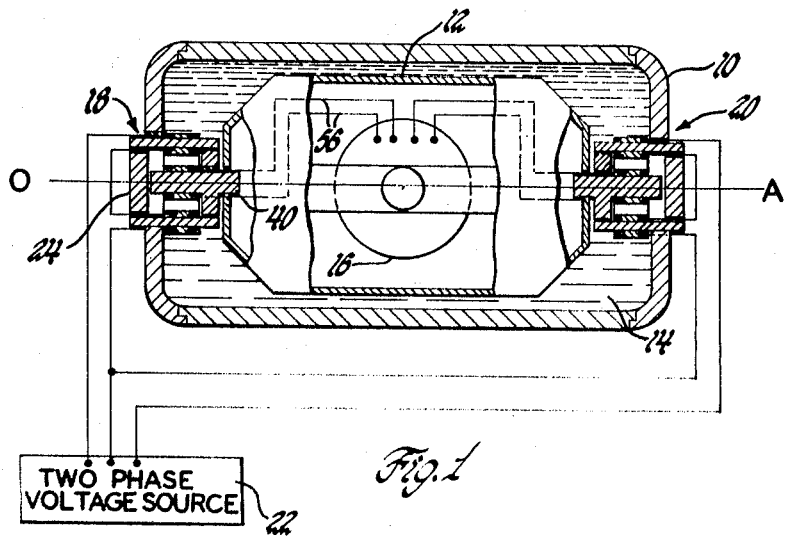
FIGURE 1 is a schematic cross-sectional view of a single degree of freedom gyro showing the application of an embodiment of the invention thereto.

Referring to FIGURE 1, there is shown, schematically, a single-axis gyroscope of the floated type having a closed cylindrical housing 10, a float 12 disposed within the housing 10 and buoyed by floatation fluid 14. For the gyro to function, it is necessary that the float 12 be supported relative to the housing 10 to permit freedom of roation about an output axis O-A and to supply energizing power to a hysteresis motor 16 carried by the float 12. Motor 16, of course, drives the gyro rotor, not shown.

In accordance with the invention, this is accomplished by means of combined support and power transformer assemblies 18 and 20 which are disposed at axially opposite ends of the gyroscope along the output axis O-A. As will be described in the following, the assemblies 18 and 20 function to magnetically support the float 12 out of physical contact with the housing 10 and with freedom to rotate about the output axis O-A. Assemblies 18 and 20 also supply power to the hysteresis motor 16 from a two-phase source 22.

Figures 2, 3:
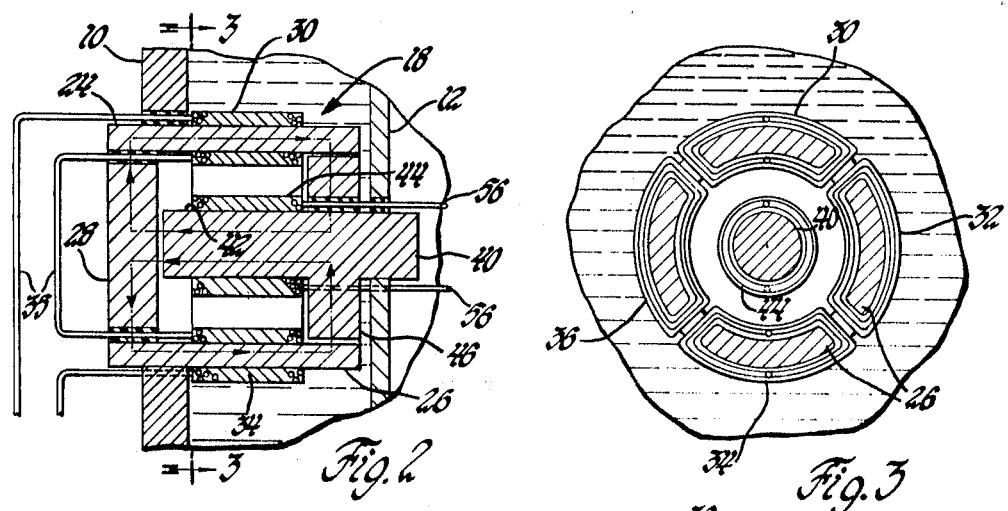
FIGURE 2 is an enlarged side view in cross section of the embodiment of the invention shown in FIGURE 1.
FIGURE 3 is a view of the FIGURE 2 apparatus taken along section line 3—3 thereof.

Referring to FIGURES 2 and 3, the construction of the assembly 18 is shown in greater detail. This description applies equally to assembly 20 since both assemblies 18 and 20 are identical. Assembly 18 includes a stator 24 which is mechanically affixed to the housing 10, and a rotor 40 which is affixed to float 12. Stator 24 comprises a substantially cup-shaped member of magnetically permeable material and having sidewalls 26 and an end wall 28. The stator 24 is disposed such that the longitudinal axis thereof corresponds with the output axis of the gyro. The sidewalls 26 of the stator 24 are slotted to accommodate primary windings 30, 32, 34 and 36. The windings are circumferentially uniformly spaced about the sidewalls 26 as best shown in FIGURE 3. When energized by the two-phase alternating voltage source 22, which is connected by conductive means 35 to the windings, a time-varying flux pattern is produced axially through the sidewalls as shown by the arrows in FIGURE 2.

Assembly 18 further include a rotor 40 which is mechanically affixed to the float 12 along the output axis thereof. Rotor 40 is substantially cylindrical in shape and is constructed of magnetically permeable material. The rotor 40 includes a substantially elongated cylindrical portion 42 which extends axially into the cup-shaped stator 24. As shown in FIGURE 2, the portion 42 is adjacent but axially spaced from the end wall 28 of stator 24 to define an axial gap. Rotor 40 further includes an annular portion 46 of increased radius which extends radially adjacent but spaced from the sidewalls 26 of the stator 24 to define a radial gap. The flow of flux produced by primary windings 30, 32, 34 and 36 thus extends axially through the sidewalls 26, radially across the radial gap into the annular portion 46 of rotor 40, axially through the cylindrical portion 42 of the rotor and across the axial gap to the end wall 28 of stator 24. Accordingly, both axial and radial magnetic supporting forces act upon the rotor 40. Since equal and opposite axial forces are produced by assemblies 18 and 20, the float 12 is maintained in a centralized position within the housing 10 in the absence of outside forces.

Figure 4:
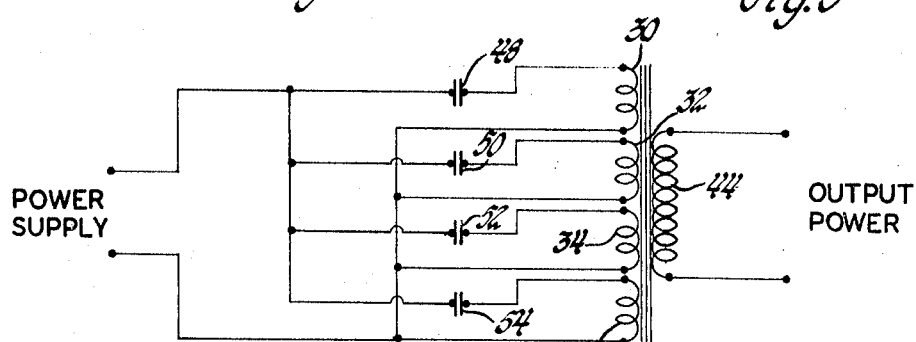
FIGURE 4 is a schematic diagram of the energizing circuits which are employed with the embodiments shown in FIGURES 1-3.

Looking to FIGURE 4, it can be seen that the first phase of the two-phase power source 22 is connected in parallel with each of the coil windings 30, 32, 34 and 36.

From FIGURE 1, it is apparent that the other phase is applied to assembly 20. Accordingly, each of the windings is energized by a voltage which is in phase with that of the other windings. In addition, the windings 30, 32, 34 and 36 have connected in series therewith tuning capacitors 48, 50, 52 and 54, respectively. The tuning capacitors provide tuned magnetic circuits. The parameters of these circuits are chosen such that as the gaps previously defined increase, due to some acceleration force on the gyro, the inductance of the circuit associated therewith decreases. With the decrease in inductance, the current in the primary winding increases thus causing an increase in the flux level. This increase in flux tend to increase the attractive force between the stator and rotor and accordingly pulls the rotor back into the reference position shown in FIGURES 1 and 2. Should the air gap decrease, the current and thus the flux are decreased and the magnetic force is also decreased. Since assemblies 18 and 20 are located on opposite ends of the float 12-housing 10 combination shown in FIGURE 1, the float 12 is stabilized in a central position by means of the tuned-magnetic circuits and tends to return to this position despite the presence of disturbing accelerations. Similarly, the presence of a plurality of primary coils produces a radial stability at each assembly independent of the action occurring at the axially opposite assembly. Thus the float 12 is stably supported within the housing 10 but is still free to rotate about the output axis O-A.

As previously discussed, it is also the function of the assemblies 18 and 20 to supply power from source 22 to the hysteresis motor 16 carried by float 12. To accomplish this function, a secondary winding 44 is disposed about the cylindrical portion 42 of rotor 40 as shown in FIGURES 2 and 3. This secondary winding 44 is connected by conductive means 56 to one phase of the hysteresis motor 16. Since the hysteresis motor 16 is of the two-phase type, a separate phase of the source 22 is connected to each of the primary winding combinations associated with the assemblies 18 and 20. Since, as shown in FIGURE 2, the time-varying flux pattern extends axially through the portion 42 of rotor 40 a secondary voltage is induced in winding 44 which energizes the motor 16.

While the invention has been described with respect to an illustrative embodiment thereof, it is to be understood that various modifications and additions to the embodiment are possible without departing from the spirit and scope of the invention as defined by the appended claims.

What is claimed is:

1. A combined magnetic suspension and power transformation system for a body having a desired axis of rotation, said system comprising a stator which is fixed in reference position and a rotor connected to the body, the stator including a substantially cup-shaped member of magnetically permeable material having sidewalls and an end wall and dimensioned to accommodate at least a portion of the rotor therein, a plurality of primary windings mounted on the sidewalls for inducing flux longitudinally therein, the rotor including a member of permeable material extending into but both radially and axially spaced from the stator to define radial and axial gaps, and a secondary winding mounted on the rotor, an electrical load device carried by the body and means for connecting said device to the secondary winding, the longitudinal axes of the rotor and stator coresponding to the axis of rotation whereby energization of the primary windings produces flux across both the axial and radial gaps tending to support the body and an electrical signal in the secondary winding for powering said load device.

2. Apparatus as defined in claim 1 including a source of alternating voltage, means connecting said plurality of windings individually in parallel with the source, and tuning means connected in circuit with each of said windings.

3. Apparatus as defined in claim 1 wherein the stator accommodates four windings uniformly circumferentially spaced about the sidewalls.

4. Apparatus as defined in claim 1 wherein the rotor includes a cylindrical portion extending axially adjacent but spaced from the stator end wall, and an annular portion of increased radius extending radially adjacent but spaced from the stator sidewalls to define th axial and radial flux gaps, respectively.

5. In combination, a single degree of freedom gyro having a housing, a float contained within the housing for rotation about an axis, a motor disposed within the float, combined support and transformer means disposed at each end of the float, each of said combined means comprising a cup-shaped stator having sidewalls and an end wall of permeable material affixed to the housing, a plurality of primary coils mounted on the sidewalls for producing flux axially therein, a rotor of permeable material affixed to the float along the rotational axis and extending into the stator, the rotor comprising a cylindrical portion extending axially adjacent but spaced from the stator end wall and an annular portion extending radially adjacent but spaced from the stator sidewalls to define respective axial and radial gaps, means for energizing the primary coils to produce a time-varying flux which travels through the sidewalls, across the radial gap, axially through the rotor and across the axial gap to the end wall, a secondary winding mounted on the cylindrical rotor portion for producing a voltage in response to the flux in the rotor, and means connecting the secondary winding to the motor.

6. Apparatus as defined in claim 5 wherein the energizing means comprises a source of alternating voltage said means connecting the source in parallel with each of said primary windings.

7. Apparatus as defined in claim 6 wherein said plurality includes four primary windings uniformly spaced about the stator sidewalls.

8. Apparatus as defined in claim 7 including tuning means connected in circuit with each of the primary windings thereby to stabilize the magnetically suspended float in the presence of disturbing accelerations.

9. Apparatus as defined in claim 8 wherein the source is a two-phase source, a separate phase of the source being connected to each combined support and transformer means.

References Cited

UNITED STATES PATENTS

| | | | |
|---|---|---|---|
| 2,809,526 | 10/1957 | Lundberg | 74—5 |
| 3,079,574 | 2/1963 | Garcia | 308—10 X |
| 3,146,038 | 8/1964 | Lautzenhiser | 308—10 |
| 3,199,932 | 8/1965 | Clark | 308—10 |
| 3,316,032 | 4/1967 | Wolf | 308—10 |

ORIS L. RADER, Primary Examiner

EZRA SUTTON, Assistant Examiner